(12) United States Patent
Hashimoto et al.

(10) Patent No.: US 9,733,642 B2
(45) Date of Patent: Aug. 15, 2017

(54) VEHICLE CONTROL DEVICE

(71) Applicant: TOYOTA JIDOSHA KABUSHIKI KAISHA, Toyota-shi, Aichi (JP)

(72) Inventors: Ryuta Hashimoto, Susono (JP); Haruto Torii, Toyota (JP); Tetsuya Taira, Nisshin (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/049,896

(22) Filed: Feb. 22, 2016

(65) Prior Publication Data

US 2016/0259334 A1 Sep. 8, 2016

(30) Foreign Application Priority Data

Mar. 2, 2015 (JP) ................................. 2015-040708

(51) Int. Cl.
*B60W 50/00* (2006.01)
*G05D 1/00* (2006.01)
*B60W 50/08* (2012.01)
*B60W 50/14* (2012.01)

(52) U.S. Cl.
CPC ......... *G05D 1/0061* (2013.01); *B60W 50/082* (2013.01); *B60W 50/14* (2013.01); *G05D 1/0088* (2013.01); *G05D 2201/0213* (2013.01)

(58) Field of Classification Search
CPC combination set(s) only.
See application file for complete search history.

(56) References Cited

U.S. PATENT DOCUMENTS

| 5,774,069 A | 6/1998 | Tanaka et al. |
| 7,301,466 B2* | 11/2007 | Asai .................. B60R 1/00 250/330 |
| 8,423,280 B2* | 4/2013 | Edwards ............... G01S 7/062 340/435 |
| 8,589,014 B2 | 11/2013 | Fairfield et al. |
| 2002/0080017 A1* | 6/2002 | Kumata ............... B60R 1/00 340/436 |
| 2008/0143833 A1* | 6/2008 | Yanai ................. B60R 1/00 348/148 |
| 2014/0018993 A1 | 1/2014 | Kindo et al. |

(Continued)

FOREIGN PATENT DOCUMENTS

| JP | 09-161196 A | 6/1997 |
| JP | 2010-264829 A | 11/2010 |

(Continued)

*Primary Examiner* — Yonel Beaulieu
(74) *Attorney, Agent, or Firm* — Sughrue Mion, PLLC

(57) ABSTRACT

A vehicle control device is capable of switching a driving state of a host vehicle between manual driving and autonomous driving, and determines whether or not another vehicle exists in a driver's blind area set in advance diagonally behind the host vehicle in a case where the driving state of the host vehicle is autonomous driving and when the host vehicle reaches a check timing set in advance. In addition, the vehicle control device executes the control in a case where it is determined that the other vehicle exists in the driver's blind area and when the other vehicle exists, which can be removed from the driver's blind area by the control of at least one of a vehicle speed of the host vehicle and a lateral position of the host vehicle.

4 Claims, 9 Drawing Sheets

(56) References Cited

U.S. PATENT DOCUMENTS

2014/0297094 A1    10/2014   Dolgov et al.
2016/0200249 A1*    7/2016   Boyd ...................... B60Q 9/00
                                                          340/459

FOREIGN PATENT DOCUMENTS

JP       2011-131838 A    7/2011
JP       2014-089691 A    5/2014

* cited by examiner

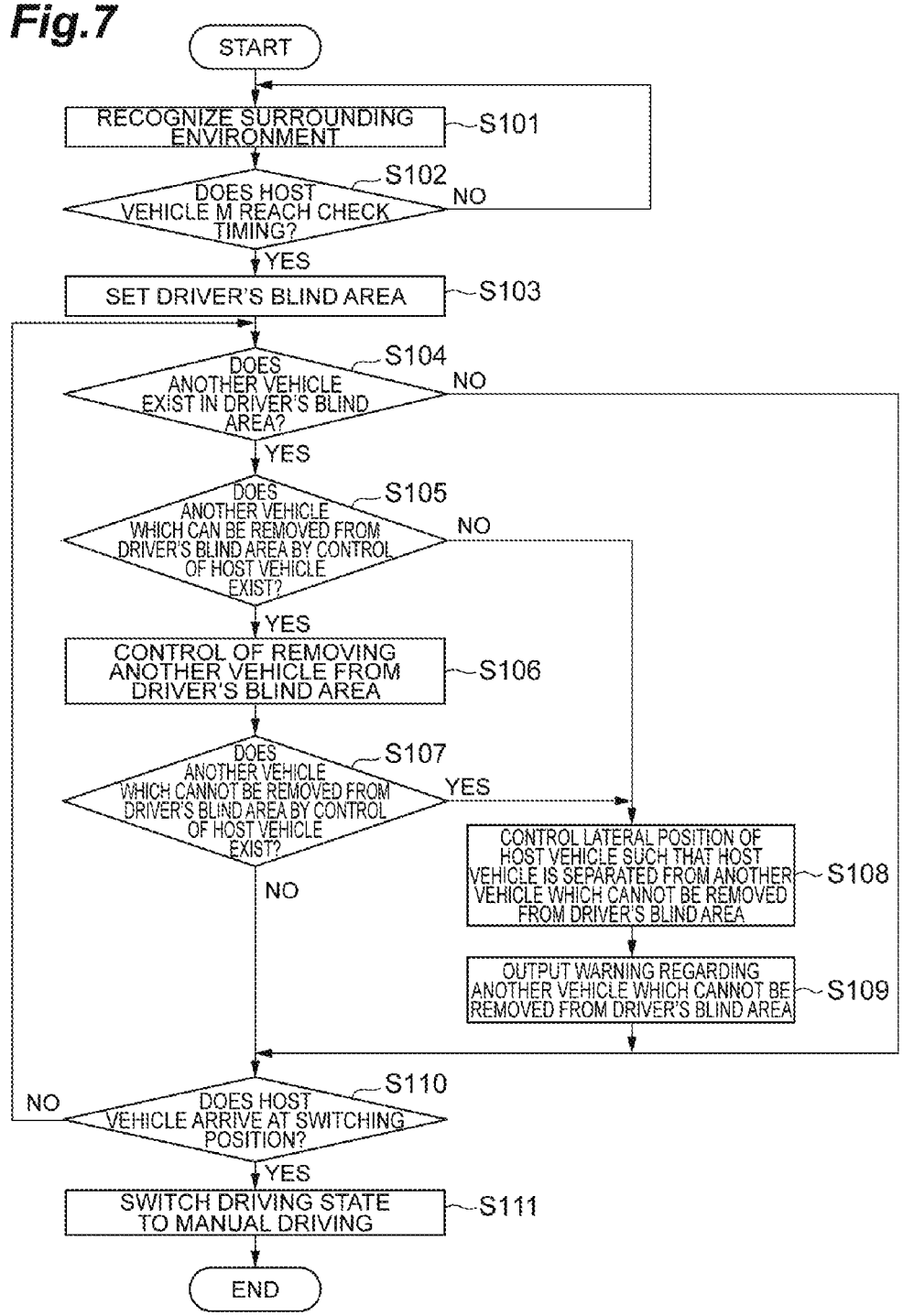

VEHICLE CONTROL DEVICE

TECHNICAL FIELD

The present invention relates to a vehicle control device capable of switching a driving state of a host vehicle between autonomous driving and manual driving.

BACKGROUND

In the related art, Japanese Unexamined Patent Application Publication No. 9-161196 is known as technical literature relating to a vehicle control device in which a driving state of a host vehicle can be switched between autonomous driving and manual driving. In the publication, a device is disclosed, in which a switching position (planned position) where the driving state of the host vehicle to be switched from autonomous driving to manual driving is set in advance, and in a case where the host vehicle approaches the switching position, a notification prompting a driver to switch the driving state to manual driving is given. In addition, in U.S. Pat. No. 8,589,014, a technology for controlling the host vehicle in autonomous driving so as to reduce a blind area of vehicle-mounted sensors is disclosed.

SUMMARY

Incidentally, when switching the driving state of the host vehicle from autonomous driving to manual driving, it is preferable for the driver that surroundings of the host vehicle are in a situation of easily being recognized. In the above-described device in the related art, the situation of the surroundings of the host vehicle at the time when the driving state is switched to manual driving is not taken into consideration. For this reason, at the time when the driving state is switched to manual driving, if another vehicle exists in a blind area where the driver cannot recognize such a vehicle, the driver cannot recognize the other vehicle in the blind area, and thus, an improvement is desired in this respect.

Therefore, in the present technical field, it is desired to provide a vehicle control device that can control a vehicle such that another vehicle does not exist in a driver's blind area before the host vehicle in autonomous driving switches to manual driving.

In order to solve the problems described above, according to an aspect of the present invention, there is provided a vehicle control device configured to be capable of switching a driving state of a host vehicle between autonomous driving and manual driving, and switching the driving state of the host vehicle to manual driving in a case where the host vehicle in autonomous driving arrives at a switching position set in advance on a route. The vehicle control device includes: an another vehicle recognition unit configured to recognize a position of another vehicle around the host vehicle; a travelling state recognition unit configured to recognize a travelling state of the host vehicle; a check timing determination unit configured to determine whether or not the host vehicle reaches a check timing set in advance, in a case where the driving state of the host vehicle is autonomous driving; an another vehicle existence determination unit configured to determine whether or not the other vehicle exists in a driver's blind area set in advance diagonally behind the host vehicle based on the result of the recognition by the another vehicle recognition unit, in a case where the check timing determination unit determines that the host vehicle reaches the check timing; a possibility determination unit configured to determine whether or not the other vehicle exists, which can be removed from the driver's blind area by control of at least one of a vehicle speed of the host vehicle and a lateral position of the host vehicle based on the result of recognition by the another vehicle recognition unit and the travelling state recognition unit, in a case where the another vehicle existence determination unit determines that the other vehicle exists in the driver's blind area; and a control unit configured to execute the control of the host vehicle based on the result of recognition by the another vehicle recognition unit and the travelling state recognition unit, in a case where the possibility determination unit determines that the other vehicle exists, which can be removed from the driver's blind area by the control.

In the vehicle control device according to the aspect of the present invention, in a case where it is determined that the host vehicle reaches the check timing and that another vehicle exists in the driver's blind area, it is determined whether or not the other vehicle exists, which can be removed from the driver's blind area by the control of at least one of the vehicle speed and the lateral position of the host vehicle. Then, in a case where it is determined that the other vehicle exists, which can be removed from the driver's blind area by the control of the host vehicle, the vehicle control device can remove the other vehicle from the driver's blind area by the control of the host vehicle. Therefore, according to the vehicle control device, before the host vehicle in autonomous driving switches to manual driving, it is possible to control the vehicle such that the other vehicle does not exist in the driver's blind area.

In the vehicle control device described above, in a case where the another vehicle existence determination unit determines that the other vehicle exists in the driver's blind area, the possibility determination unit may determine whether or not the other vehicle exists, which cannot be removed from the driver's blind area by the control based on the result of recognition by the another vehicle recognition unit and the travelling state recognition unit. In a case where the possibility determination unit determines that the other vehicle exists, which cannot be removed from the driver's blind area by the control, the control unit may control the lateral position of the host vehicle so as to be separated from the other vehicle which cannot be removed from the driver's blind area based on the result of recognition by the another vehicle recognition unit and the travelling state recognition unit.

According to the vehicle control device, in a case where the other vehicle exists, which cannot be removed from the driver's blind area by the control of the host vehicle such as a case where the plurality of other vehicles travel in the adjacent lane, the lateral position of the host vehicle is controlled so as to be separated from the other vehicle which cannot be removed from the driver's blind area. Therefore, according to the vehicle control device, it is possible to reduce the possibility that the host vehicle is affected by the other vehicle in the driver's blind area when the driving state is switched from autonomous driving to manual driving.

In the vehicle control device described above, in a case where the another vehicle existence determination unit determines that the other vehicle exists in the driver's blind area, the possibility determination unit may determine whether or not the other vehicle exists, which cannot be removed from the driver's blind area by the control based on the result of recognition by the another vehicle recognition unit and the travelling state recognition unit. In a case where the possibility determination unit determines that the other vehicle exists, which cannot be removed from the driver's blind area by the control, the control unit may output a warning regarding the other vehicle which cannot be removed from the driver's blind area to the driver of the host vehicle.

According to the vehicle control device, in a case where the other vehicle exists, which cannot be removed from the driver's blind area by the control of the host vehicle such as a case where the plurality of other vehicles travel in the adjacent lane, the warning regarding the other vehicle which cannot be removed from the driver's blind area is output to the driver of the host vehicle. Therefore, according to the vehicle control device, it is possible to notify the driver of the existence of the other vehicle which cannot be visually recognized by the driver by the warning when the driving state is switched from autonomous driving to manual driving.

As described above, according to the aspect of the present invention, it is possible to control a vehicle such that another vehicle does not exist in a driver's blind area before the host vehicle in autonomous driving switches to manual driving.

BRIEF DESCRIPTION OF THE DRAWINGS

FIG. 7 is a flowchart illustrating control of switching to manual driving by the vehicle control device in the present embodiment.

DETAILED DESCRIPTION

Figure 1:
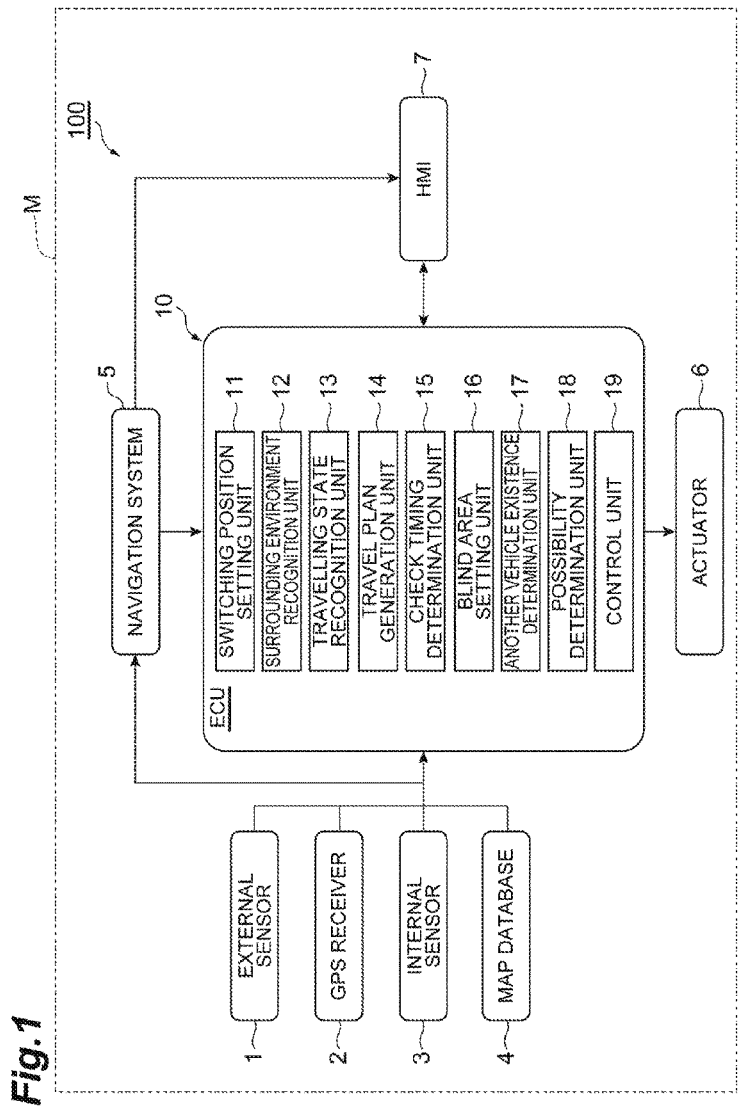
FIG. 1 is a block diagram illustrating a vehicle control device in the present embodiment.

Hereinafter, embodiments of the present invention will be described with reference to the drawings. In the drawings, the same reference signs will be given to the same or similar elements and the description thereof will not be repeated.

FIG. 1 is a block diagram illustrating a vehicle control device 100 in the present embodiment. The vehicle control device 100 in FIG. 1 is mounted, for example, on a host vehicle M such as a passenger car, and controls the travelling of the host vehicle M. The vehicle control device 100 realizes autonomous driving of the host vehicle M. Autonomous driving is, for example, a driving state in which the host vehicle M is caused to autonomously travel along a road on which vehicles travel. In autonomous driving, for example, a driving state is included, in which the host vehicle M is caused to autonomously travel on a route set in advance toward a destination without a driving operation by the driver.

The vehicle control device 100 is configured so as to be capable of switching the driving state of the host vehicle M from autonomous driving to manual driving. Manual driving is a driving state in which the host vehicle M is caused to travel mainly, for example, by the driving operation of the driver. In manual driving, for example, a driving state is included, in which the host vehicle M is caused to travel based on only the driving operation of the driver. Here, in manual driving in the present embodiment, a driving state is also included, in which a driving operation assist control for assisting the driving operation of the driver is performed while the driving operation of the driver is the main operation. In the driving operation assist control, for example, an adaptive cruise control (ACC) or a lane trace control (LTC) is included.

The vehicle control device 100 starts autonomous driving in a case where, for example, the driver performs the operation of starting autonomous driving. The operation of starting autonomous driving is, for example, an operation of pushing an autonomous driving start switch provided on a steering wheel. The vehicle control device 100 releases autonomous driving in a case where, for example, the driver performs the operation of releasing autonomous driving. The operation of releasing autonomous driving is, for example, an operation of pushing an autonomous driving cancel switch provided on the steering wheel. In addition, the vehicle control device 100 may release autonomous driving in a case where a driving operation having an operation amount exceeding an allowable operation amount for autonomous driving set in advance is performed in such a case as the driver performing a rapid braking operation during autonomous driving or the like.

In a case where it is determined that the host vehicle M in autonomous driving arrives at a switching position set in advance, the vehicle control device 100 switches the driving state of the host vehicle M from autonomous driving to manual driving. The switching position is a reference position where the driving state of the host vehicle M is switched from autonomous driving to manual driving. For example, the switching position corresponds to a position of a boundary between a road environment in which autonomous driving can be continued and a road environment in which autonomous driving cannot be continued on the route of the vehicle. The switching position may be a position of host vehicle M side (front side) from the position of a boundary on the route of the host vehicle M.

Figure 2:
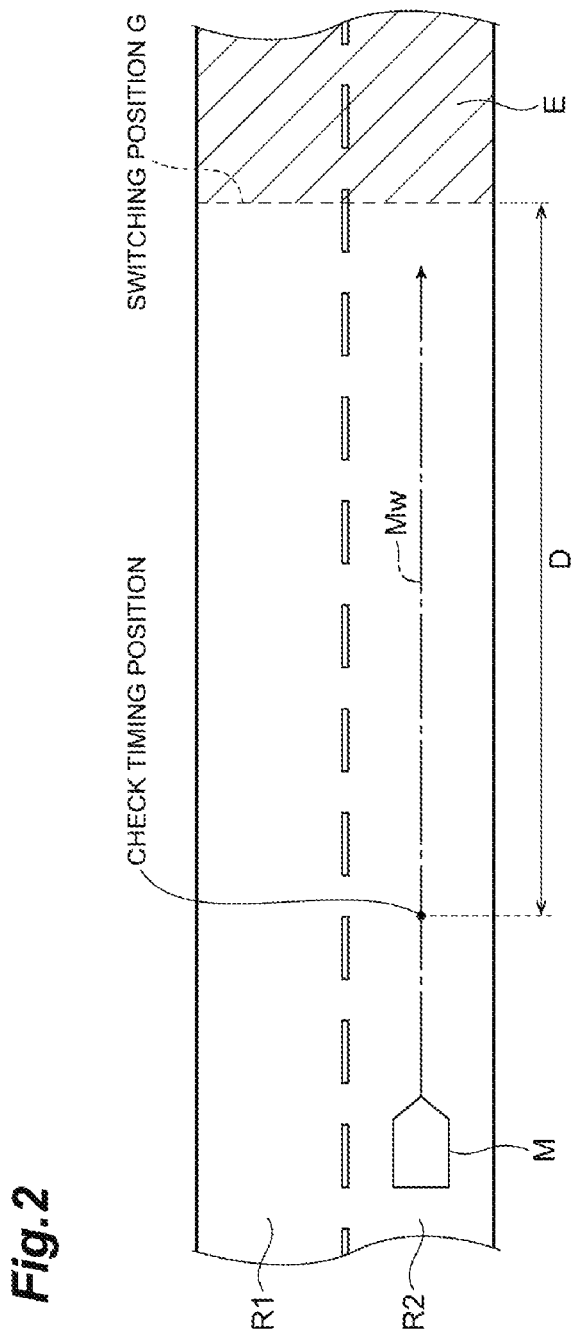
FIG. 2 is a plan view illustrating a switching position where a driving state of a host vehicle is switched from autonomous driving to manual driving.

Here, FIG. 2 is a plan view illustrating a switching position G where the driving state of the host vehicle M is switched from autonomous driving to manual driving. A travelling lane R1 on which the host vehicle M travels, an adjacent lane R2 that is adjacent to the left side of the travelling lane R1, a route Mw of the host vehicle M, the switching position G, a road construction section E, a check timing position T, and a distance D from the switching position G to the check timing position T are illustrated in FIG. 2. The check timing position T and the distance D will be described below.

FIG. 2 illustrates a situation in which the host vehicle M in autonomous driving is approaching the switching position G. The switching position G illustrated in FIG. 2 positions at an entrance of the road construction section E. As above, the switching position G can be a boundary position between, for example, a road section where the vehicle-mounted sensor can recognize a lane line (a lane boundary line or a vehicular lane boundary line) in which the host vehicle M travels and a road section (a road construction section, a section with snow accumulation, or a section where a lane line cannot be recognized due a blurred line) in which the vehicle-mounted sensor cannot recognize the lane line on the road. The switching position G can be a boundary position between a road section in which weather conditions such as a crosswind enables autonomous driving to be performed and a road section in which weather conditions do not enable autonomous driving to be performed. The switching position G can be a boundary position between a road section in which autonomous driving can be performed because there are no traffic regulations due to a traffic accident and a road section in which autonomous driving cannot be performed because there are traffic regulations due to a traffic accident.

In addition, for example, in a case where the host vehicle M performs autonomous driving exclusively for a highway, the switching position G can also be a position at an exit of the highway which is a boundary position between the highway in which autonomous driving can be continued and an ordinary road in which autonomous driving cannot be continued. The vehicle control device 100 recognizes the switching position G based on, for example, map information or a road-to-vehicle communication.

The vehicle control device 100 may switch the driving state of the host vehicle M from autonomous driving to manual driving based on other factors. The vehicle control device 100 may switch the driving state of the host vehicle M from autonomous driving to manual driving when it determines that accuracy of the sensors necessary for autonomous driving (camera, radar sensor, etc.) has deteriorated. The vehicle control device 100 may switch the driving state of the host vehicle M from autonomous driving to manual driving when it determines that accuracy of vehicle control has deteriorated due to an actuator of the host vehicle M malfunctioning and the like. The vehicle control device 100 may switch the driving state of the host vehicle M from autonomous driving to manual driving based on positional situations between another vehicle and the host vehicle (such as when the host vehicle merges between other vehicles in heavy traffic).

In a case where the driving state of the host vehicle M is autonomous driving, and when it is determined that the host vehicle M reaches a check timing set in advance, the vehicle control device 100 determines whether or not another vehicle exists in the driver's blind area of the host vehicle M. The check timing is a timing which is a reference for performing the determination whether or not another vehicle exists in the driver's blind area. The determination of whether or not the host vehicle M reaches the check timing is performed based on a distance between the host vehicle M and the switching position G on the route of the host vehicle M (for example, on the route in the travelling plan by the autonomous driving). The check timing may be a timing at which the distance between the host vehicle M and the switching position G is equal to or shorter than a distance D set in advance. The check timing position T illustrated in FIG. 2 is a position to the host vehicle M side from the switching position G as much as the distance D. In this case, the vehicle control device 100 determines that the host vehicle M reaches the check timing when the host vehicle M arrives at the check timing position T.

The vehicle control device 100 may determine whether or not the host vehicle M reaches the check timing based on an arrival window time which is a time for the host vehicle M to arrive at the switching position G. For example, the arrival window time can be obtained by dividing the distance between the host vehicle M and the switching position G by the current speed of the host vehicle M. In this case, the vehicle control device 100 determines that the host vehicle M reaches the check timing when, for example, the arrival window time for the host vehicle M to arrive at the switching position G is equal to or shorter than a threshold value set in advance.

Next, the driver's blind area will be described. The driver's blind area is an area set diagonally behind the host vehicle M in advance such that the driver of the host vehicle M can correspond to the blind spot. The driver's blind area is set at at least one of the diagonally behind the host vehicle M in the left side or diagonally behind the host vehicle M in the right side. The driver's blind area is not necessarily coincident with the blind spot of the driver.

Figure 3:
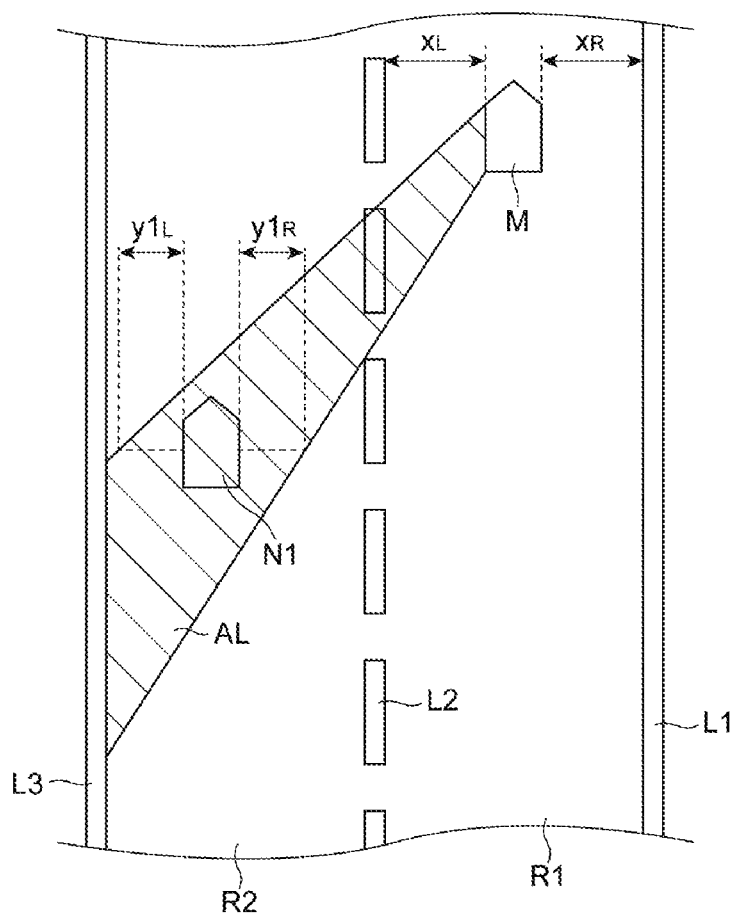
FIG. 3 is a plan view illustrating a situation in which another vehicle exists in a driver's blind area on a one-direction two-lane road.

Here, FIG. 3 is a plan view illustrating a situation in which another vehicle N1 exists in a driver's blind area AL on a one-direction two-lane road. In FIG. 3, a lane line L1 that forms a travelling lane R1, a lane line L2, and a lane line L3 that forms an adjacent lane R2 together with the lane line L2 are illustrated. $x_L$, $x_R$, $y1_L$, and $y1_R$ illustrated in FIG. 3 will be described below.

As illustrated in FIG. 3, the driver's blind area AL is set diagonally behind the host vehicle M in the left side. Another vehicle N1 which is travelling in the adjacent lane R2 on the left side of the host vehicle M is included in the driver's blind area AL. In the situation illustrated in FIG. 3, the vehicle control device 100 determines that another vehicle N1 exists in the driver's blind area AL.

Figure 4:
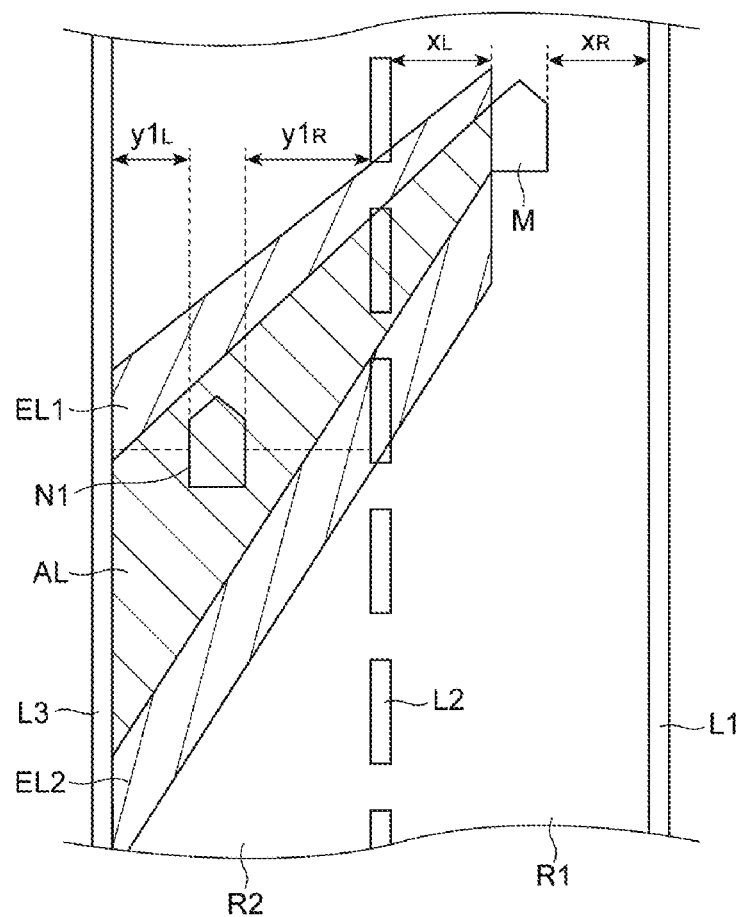
FIG. 4 is a plan view illustrating an expansion area.

FIG. 4 is a plan view illustrating expansion areas EL1 and EL2. As illustrated in FIG. 4, the vehicle control device 100 may set expansion areas EL1 and EL2 including the driver's blind area AL. The expansion area EL1 is an area that expands the driver's blind area AL to in front of the host vehicle M. The expansion area EL2 is an area that expands the driver's blind area AL to behind the host vehicle M. For example, in a case where it is determined that another vehicle exists in the expansion area EL1 and EL2, the vehicle control device 100 determines that another vehicle exists in the driver's blind area AL. The expansion area may be set in the driver's blind area AR described below which is set diagonally behind the host vehicle M in the right direction. In addition, the expansion area EL1 and the expansion area EL2 are not necessarily set on both sides, and may be set at least only one side.

Figure 5:
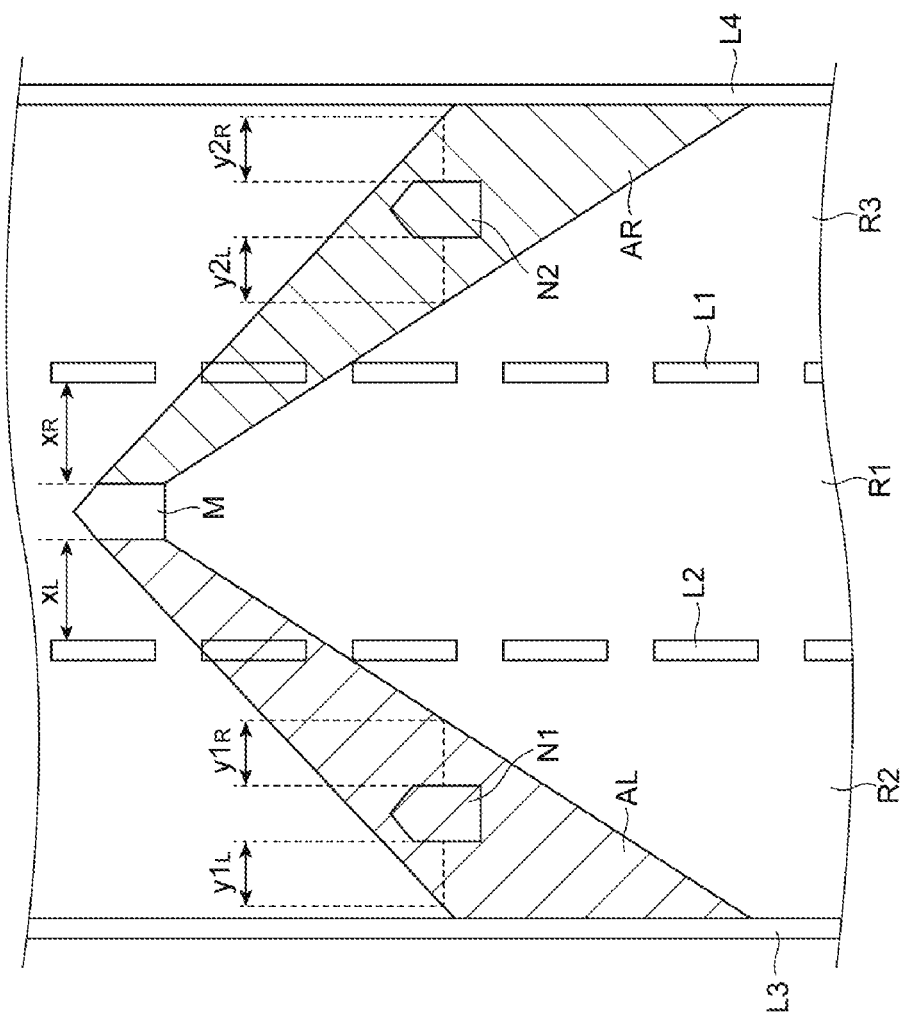
FIG. 5 is a plan view illustrating a situation in which another vehicle exists in a driver's blind area on a one-direction three-lane road.

FIG. 5 is a plan view illustrating a situation in which another vehicle N1 and another vehicle N2 exist in a driver's blind areas AL and AR on a one-direction three-lane road. The adjacent lane R2 which is adjacent to the right side of the travelling lane R1 and a lane line L4 that forms the adjacent lane R2 together with the lane line L1 are illustrated in FIG. 5. $y2_L$ and $y2_R$ illustrated in FIG. 5 will be described below. The host vehicle M is travelling in the travelling lane R1 in the middle of the one-direction three-lane road.

As illustrated in FIG. 5, the driver's blind area AL is set diagonally behind the host vehicle M in the left side. In addition, the driver's blind area AR is set diagonally behind the host vehicle M in the right side. Another vehicle N1 travelling in the adjacent lane R2 on the left side of the host vehicle M is included in the driver's blind area AL. Another vehicle N2 travelling in the adjacent lane R2 on the right side of the host vehicle M is included in the driver's blind area AR. In the situation illustrated in FIG. 5, the vehicle control device 100 determines that another vehicle N1 exists in the driver's blind area AL and another vehicle N2 exists in the driver's blind area AR. Hereinafter, in a case of specifically distinguishing between the left and right driver's blind areas, the terms of driver's blind area AL and AR will be used, and in a case of not distinguishing between the left and right driver's blind areas, simply the term of driver's blind area will be used.

For example, in a case where the entire part of another vehicle falls within the driver's blind area, the vehicle control device 100 determines that the other vehicle exists in the driver's blind area. For example, in a case where a part of another vehicle is positioned outside of the driver's blind area, the vehicle control device 100 determines that another vehicle does not exist in the driver's blind area. Even if a part of another vehicle is positioned outside of the driver's blind area, in a case where the center of another vehicle (for example, center of another vehicle in a plan view) is positioned within the driver's blind area, the vehicle control device 100 may determine that the other vehicle exists in the driver's blind area.

In a case where it is determined that another vehicle exists in the driver's blind area, by controlling at least one of the vehicle speed of the host vehicle M and the lateral position of the host vehicle M, the vehicle control device 100 determines whether or not the other vehicle that is removed from the driver's blind area exists. In a case where it is determined by the control of the host vehicle M that the other vehicle that removed from the driver's blind area exists, the vehicle control device 100 executes the control of the host vehicle M such that the other vehicle is removed from the driver's blind area. The lateral position is, for example, a position of the host vehicle M in the lane width direction of the travelling lane R1. Here, the controlling of the host vehicle M such that the other vehicle is removed from the driver's blind area includes the controlling of the host vehicle M such that the situation is close to the situation that the other vehicle is removed from the driver's blind area even if the other vehicle eventually cannot be removed from the driver's blind area.

Figure 6A:
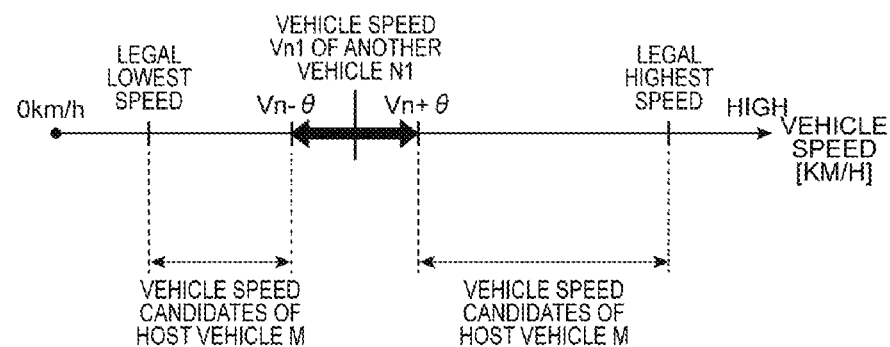
FIG. 6A is a diagram illustrating a vehicle speed candidate of the host vehicle in a case where another vehicle exists in the driver's blind area.

First, an example of a control of the vehicle speed of the host vehicle M by the vehicle control device 100 will be described. FIG. 6A is a diagram illustrating vehicle speed candidates of the host vehicle M in a case where another vehicle N1 exists in the driver's blind area AR. The situation of the surroundings of the host vehicle M assumed in FIG. 6A is, for example, a situation in FIG. 2. In FIG. 6A, one axis representing the vehicle speed is illustrated and the right side indicates that the speed is high.

As illustrated in FIG. 6A, in a case where a vehicle speed Vn1 of the other vehicle N1 existing in the driver's blind area AL is recognized by the radar, the vehicle control device 100 calculates a range (from Vn1−θ to Vn1+θ) within a predetermined vehicle speed threshold value θ with the vehicle speed Vn1 as a center.

The vehicle speed threshold value θ is a threshold value used for removing the other vehicle N1 from the driver's blind area AL by controlling the vehicle speed of the host vehicle M. The vehicle speed threshold value θ is a positive value. The vehicle speed threshold value θ may be a fixed value or may be a value changing according to the vehicle speed of the other vehicle. In a case where there is no vehicle speed candidate that can be taken by the host vehicle M, the vehicle speed threshold value θ may be changed to a small value. The vehicle speed threshold value θ may be a small value as an emergency degree which requires the switching of the driving state to the manual driving becomes higher. The emergency degree can be a higher value as the distance between the host vehicle M and the switching position G becomes shorter. In addition, for example, the vehicle control device 100 recognizes a legal lowest speed and a legal highest speed in the travelling lane R1 in which the host vehicle M travels based on the position information and the map information of the host vehicle M.

In the situation illustrated in FIG. 6A, as the vehicle speed candidate of the host vehicle M for removing the other vehicle N1 from the driver's blind area AL, the vehicle control device 100 calculates the vehicle speed range from the legal lowest speed to Vn1−θ and the speed range from Vn1+θ to the legal highest speed. The vehicle control device 100 calculates a target vehicle speed that is a vehicle speed closest to the current vehicle speed among the vehicle speed candidates based on, for example, the current vehicle speed of the host vehicle M. In a case where the current vehicle speed is included in the vehicle speed candidates, the current vehicle speed becomes the target vehicle speed. The vehicle control device 100 performs the control of the vehicle speed of the host vehicle M with the target vehicle speed as a target of control such that the other vehicle N1 is removed from the driver's blind area AL.

Figure 6B:
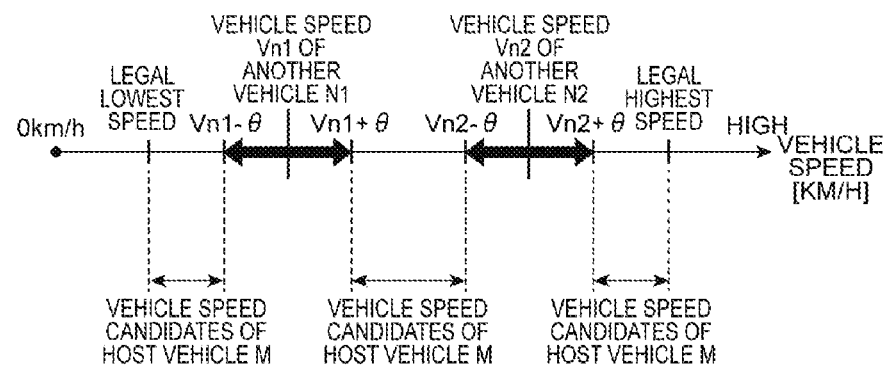
FIG. 6B is a diagram illustrating a vehicle speed candidate of the host vehicle in a case where two other vehicles exist in the driver's blind area.

FIG. 6B is a diagram illustrating vehicle speed candidates of the host vehicle M in a case where two other vehicles N1 and N2 exist in the driver's blind areas AL and AR respectively. The situation of the surroundings of the host vehicle M assumed in FIG. 6B is, for example, a situation in FIG. 4. In FIG. 6B, the vehicle control device 100 recognizes the vehicle speed Vn1 of the other vehicle N1 and the vehicle speed Vn2 of the other vehicle N2. The vehicle control device 100 calculates a range of a vehicle speed threshold value θ (from Vn1−θ to Vn1+θ and Vn2−θ to Vn2+θ) with the vehicle speed Vn1 of the other vehicle N1 and the vehicle speed Vn2 of the other vehicle N2 as a center respectively.

As the vehicle speed candidates of the host vehicle M for removing the other vehicle N1 from the driver's blind area AL and removing the other vehicle N2 from the driver's blind area AR, the vehicle control device 100 calculates the vehicle speed from the legal lowest speed to Vn1−θ, the vehicle speed from Vn1+θ to Vn2−θ, and the vehicle speed from Vn2+θ to the legal highest speed. The vehicle control device 100 calculates the target vehicle speed that is a vehicle speed closest to the current vehicle speed among the vehicle speed candidates based on, for example, the current vehicle speed of the host vehicle M. The vehicle control device 100 controls the vehicle speed of the host vehicle M. The vehicle control device 100 performs the control of the vehicle speed of the host vehicle M with the target vehicle speed as a target of control such that the other vehicles N1 and N2 are removed from the driver's blind areas AL and AR respectively.

Next, an example of controlling the lateral position of the vehicle control device 100 will be described with reference to FIG. 3. Illustrated in FIG. 3 are a laterally movable distance $x_R$ of the host vehicle M in the right direction, a laterally movable distance $x_L$ of the host vehicle M in the left direction, a distance $y1_R$ from the other vehicle N1 in the right direction to the driver's blind area AL, and a distance $y1_L$ from the other vehicle N1 in the left direction to the driver's blind area AL. The laterally movable distance $x_R$ of the host vehicle M is a distance, for example, from the right side surface of the host vehicle M to the lane line L1. The laterally movable distance $x_L$ of the host vehicle M is a distance, for example, from the left side surface of the host vehicle M to the lane line L2. The laterally movable distance $x_R$ of the host vehicle M may be a distance shorter than the distance from the right side surface of the host vehicle M to the lane line L1 by a margin distance set in advance.

Similarly, the laterally movable distance $x_L$ of the host vehicle M may be a distance shorter than the distance from the left side surface of the host vehicle M to the lane line L2 by a margin distance set in advance. The margin distance may be a fixed value or may be a value changing according to the lane width of the travelling lane R1. The margin distance can be a distance, for example, in which the lane width of the travelling lane R1 is multiplied by a certain fraction (for example 0.1).

In the lane width direction of the adjacent lane R2, for example, the distance $y1_R$ is a distance from the right side surface of the other vehicle N1 in the center in the front-rear direction to the right side end of the driver's blind area AL. In the lane width direction of the adjacent lane R2, for example, the distance $y1_L$ is a distance from the left side surface of the other vehicle N1 in the center of the front-rear direction to the left side end of the driver's blind area AL. The vehicle control device 100 calculates the distances distance $y1_R$ and the distance $y1_L$ from the driver's blind area AL based on, for example, the lateral position information of the other vehicle N1 acquired by the road-to-vehicle communication and the information on the size of the other vehicle N1. The vehicle control device 100 may estimate the lateral position information of the other vehicle N1 and the information on the size of the other vehicle N1 based on the image information from the vehicle-mounted camera. The distance $y1_R$ may be a distance not from the right side surface of the other vehicle N1 but from the center (center of the other vehicle N1 in a plan view) of the other vehicle N1 to the right side end of the driver's blind area AL. Similarly, the distance $y1_L$ may be a distance not from the left side surface of the other vehicle N1 but from the center of the other vehicle N1 to the left side end of the driver's blind area AL. The vehicle control device 100 may estimate the center position of the other vehicle N1 based on the information detected by the radar or the image information by the vehicle-mounted camera.

The vehicle control device 100 determines whether or not the laterally movable distance $x_R$ of the host vehicle M in the right direction is longer than the distance $y1_L$ of the other vehicle N1 in the left direction, and whether or not the laterally movable distance $x_L$ of the host vehicle M in the left direction is longer than the distance $y1_R$ of the other vehicle N1 in the right direction. As illustrated in FIG. 3, in a case where it is determined that the laterally movable distance $x_R$ is longer than the distance $y1_L$ and the laterally movable distance $x_L$ is longer than the distance $y1_R$, the vehicle control device 100 controls the lateral position of the host vehicle M such that the other vehicle N1 is removed from the driver's blind area AL by moving the lateral position of the host vehicle M in any direction of the right and left. The vehicle control device 100 controls the lateral position of the host vehicle M such that the other vehicle N1 is removed from the driver's blind area AL by moving the lateral position of the host vehicle M to the right direction which is the direction in which the other vehicle N1 is separated from the host vehicle M as much as the distance $y1_L$. Alternatively, the vehicle control device 100 may move the lateral position of the host vehicle M to the direction in which an amount of movement of the host vehicle M is small among the right and left directions.

Subsequently, illustrated in FIG. 5 are a distance $y2_R$ from the other vehicle N2 in the right direction to the end of the driver's blind area AR and a distance $y2_L$ from the other vehicle N2 in the left direction to the end of the driver's blind area AR. In the situation in FIG. 5, the vehicle control device 100 determines whether or not the laterally movable distance $x_R$ of the host vehicle M in the right direction is longer than the distance $y2_L$ of the other vehicle N2 in the left direction, and whether or not the laterally movable distance $x_L$ of the host vehicle M in the left direction is longer than the distance $y2_R$ of the other vehicle N2 in the right direction. As is similar to the case of the other vehicle N1 described above, the vehicle control device 100 controls the lateral position of the host vehicle M such that the other vehicle N2 is removed from the driver's blind area AR by moving the lateral position of the host vehicle M to any direction of right and left.

In a case where it is determined that, for example, the laterally movable distance $x_R$ of the host vehicle M is longer than the distance $y1_L$ of the other vehicle N1 and the laterally movable distance $x_R$ of the host vehicle M is longer than the distance $y2_L$ of the other vehicle N2, the vehicle control device 100 controls the lateral position of the host vehicle M such that both of the other vehicles N1 and N2 are removed from the driver's blind areas AL and AR respectively by moving the lateral position of the host vehicle M to the right direction. In this case, for example, the vehicle control device 100 moves the lateral position of the host vehicle M to the right direction as much as the longer distance among the distance $y1_L$ of the other vehicle N1 and the distance $y2_L$ of the other vehicle N2.

Similarly, in a case where it is determined that the laterally movable distance $x_L$ of the host vehicle M is longer than the distance $y1_R$ of the other vehicle N1 and the laterally movable distance $x_L$ of the host vehicle M is longer than the distance $y2_R$ of the other vehicle N2, the vehicle control device 100 controls the lateral position of the host vehicle M such that both of the other vehicles N1 and N2 are removed from the driver's blind areas AL and AR respectively by moving the lateral position of the host vehicle M to the right direction. For example, in a case where both of the other vehicles N1 and N2 can be removed from the driver's blind areas AL and AR respectively by moving the lateral position of the host vehicle M to any of the right or left direction, the vehicle control device 100 moves the lateral position of the host vehicle M to the direction in which the amount of movement of the host vehicle M from the current lateral position is small.

In this way, the vehicle control device 100 controls the host vehicle M such that the other vehicle is removed from the driver's blind area. The vehicle control device 100 may control the host vehicle M such that the other vehicle is removed from the driver's blind area by combining the control of the vehicle speed of the host vehicle M and the control of the lateral position of the host vehicle M.

In addition, the vehicle control device 100 may determine whether or not the other vehicle exists, which cannot be removed from the driver's blind area by the control of the host vehicle M. The control of the host vehicle M in this case is a control used for removing the other vehicle from the driver's blind area among the control of the vehicle speed of the host vehicle M and the control of the lateral position of the host vehicle M. The control of the host vehicle M may be either one of the control of the vehicle speed of the host vehicle M and the control of the lateral position of the host vehicle M or may be both. The details of the determination of whether or not the other vehicle exists, which cannot be removed from the driver's blind area by the control of the host vehicle M will be described below.

For example, in a case where it is determined that the other vehicle exists, which cannot be removed from the driver's blind area by the control of the host vehicle M, the vehicle control device 100 controls the lateral position of the host vehicle M so as to be separated from the other vehicle. For example, in a case where it is determined that both of the other vehicles N1 and N2 illustrated in FIG. 5 cannot be removed from the driver's blind areas AL and AR respectively, in order to make the host vehicle M not to be too close to any of the other vehicle N1 and the other vehicle N2, the vehicle control device 100 may control the lateral position of the host vehicle M such that the distances in the lane width direction (lateral direction) from the other vehicle N1 and other vehicle N2 become equal to each other.

In addition, for example, in a case where it is determined that the other vehicle exists, which cannot be removed from the driver's blind area by the control of the host vehicle M, the vehicle control device 100 outputs a warning regarding the other vehicle to the driver. The vehicle control device 100 outputs the warning regarding the other vehicle which cannot be removed from the driver's blind area by the host vehicle M to the driver before the host vehicle M reaches the switching position G.

Configuration of the Vehicle Control Device in the Present Embodiment

Hereinafter, a configuration of the vehicle control device 100 in the first embodiment will be described with reference to the drawings. As illustrated in FIG. 1, the vehicle control device 100 includes an external sensor 1, a global positioning system (GPS) receiver 2, an internal sensor 3, a map database 4, a navigation system 5, an actuator 6, a human machine interface (HMI) 7, and an electronic control unit (ECU) 10.

The external sensor 1 is a detection device configured to detect an external situation which is peripheral information of the host vehicle M. The external sensor 1 includes at least one of a vehicle-mounted camera, radar, and a laser imaging detection and ranging (LIDAR). The vehicle-mounted camera is an imaging device configured to image the external situation of the host vehicle M.

The vehicle-mounted camera is, for example, provided on the inside of a windshield of the host vehicle M. The vehicle-mounted camera transmits the image information on the external situation of the host vehicle M to the ECU 10. The camera may be a monocular camera or may be a stereo camera. The stereo camera has two imaging units that are arranged so as to reproduce a binocular parallax. The image information of the stereo camera also includes information in the depth direction.

The radar detects an obstacle outside of the host vehicle M using a radio wave (for example, a millimeter wave). The radar detects the obstacle by transmitting the radio wave to the surroundings of the host vehicle M and receiving the wave reflected from the obstacle. The radar transmits detected obstacle information to the ECU 10.

The LIDAR detects the obstacle outside the host vehicle M using light. The LIDAR transmits the light to the surroundings of the host vehicle M, measures the distance to the reflection point by receiving the light reflected from the obstacle, and then, detects the obstacle. The LIDAR transmits the detected obstacle information to the ECU 10. The camera, the LIDAR, and the radar are not necessarily provided in an overlapping manner.

The GPS receiver 2 measures the position of the host vehicle M (for example, the latitude and the longitude of the host vehicle M) by receiving signals from three or more GPS satellites. The GPS receiver 2 transmits the measured position information of the host vehicle M to the ECU 10. Instead of the GPS receiver 2, another means for specifying the latitude and the longitude of the host vehicle M may be used. In addition, in order to match the measured result of the sensors with the map information described below, it is preferable to provide a function of measuring an azimuth of the host vehicle M.

The internal sensor 3 is a detection device configured to detect a travelling state of the host vehicle M. The internal sensor 3 includes a vehicle speed sensor. The vehicle speed sensor is a detection device configured to detect the speed of the host vehicle M. As the vehicle speed sensor, for example, a wheel speed sensor is used, which is provided on vehicle wheels of the host vehicle M or a drive shaft and the like rotating integrally with vehicle wheels and detects a rotation speed of the vehicle wheels. The vehicle speed sensor transmits the detected vehicle speed information (vehicle wheel speed information) to the ECU 10.

The internal sensor 3 may include an acceleration sensor, or a yaw rate sensor. The acceleration sensor is, for example, a detection device configured to detect an acceleration of the host vehicle M. The acceleration sensor includes, for example, a longitudinal acceleration sensor that detects acceleration in the longitudinal direction of the host vehicle M and a lateral acceleration sensor that detects a lateral acceleration of the host vehicle M. The acceleration sensor transmits, for example, acceleration information of the host vehicle M to the ECU 10. The yaw rate sensor is a detection device of the host vehicle M configured to detect a yaw around the vertical axis of the center of gravity of the host vehicle M (rotational angular velocity). As the yaw rate sensor, for example, a gyro sensor can be used. The yaw rate sensor transmits detected yaw rate information of the host vehicle M to the ECU 10.

The map database 4 is a database in which map information is included. The map database 4 is formed, for example, in a hard disk drive (HDD) mounted on the vehicle. In the map information, for example, position information of the road, information of the road shape (for example, type of a shape of a curve or a straight portion, or a curvature of the road), information on the number of lanes, information on the lane width, information of the legal lowest speed of the road, and information on the legal highest speed of the road are included. The map database may be stored in a computer in a facility such as an information processing center which is capable of communicating with the host vehicle M.

The navigation system 5 is a device configured to perform guidance to a destination set by the driver of the host vehicle M for the driver of the host vehicle M. The navigation system 5 calculates a travelling route of the host vehicle M based on the position information of the host vehicle M measured by the GPS receiver 2 and the map information in the map database 4. The navigation system 5 calculates, for example, a target route from the position of the host vehicle M to the destination and performs notification to the driver by display on a display of the HMI 7 or a voice output of a speaker of the HMI 7. In a case where the host vehicle M is in autonomous driving, for example, autonomous driving is performed along the route calculated by the navigation system 5. The navigation system 5, for example, transmits the target route information of the host vehicle M to the ECU 10. The navigation system 5 may be stored in a computer in a facility such as an information processing center which is capable of communicating with the host vehicle M. The navigation system 5 may include a communication unit for performing wireless communication with a facility such as an information processing center or another vehicle.

The actuator 6 is a device configured to perform a travel control of the host vehicle M. The actuator 6 includes at least a throttle actuator, a brake actuator, and a steering actuator. The throttle actuator controls a supply amount (throttle opening degree) of air to an engine according to the control signal from the ECU 10, and controls the driving force of the host vehicle M. In a case where the host vehicle M is a hybrid vehicle or an electric vehicle, the actuator 6 does not include the throttle actuator and the driving force is controlled by the control signal input to a motor as a source of the driving force from the ECU 10.

The brake actuator controls a brake system according to the control signal from the ECU 10 and controls the braking force given to the wheels of the host vehicle M. For example, a hydraulic brake system can be used as the brake actuator. The steering actuator controls the driving of an assist motor that controls steering torque in the electric power steering system according to the control signal from the ECU 10. In this way, the steering actuator controls the steering torque of the host vehicle M.

The HMI 7 is an interface configured to perform input and output of information between the driver and the vehicle control device 100. The HMI 7 includes, for example, a display for displaying image information, a speaker for outputting voice information, and an operation button or a touch panel for the driver to perform an input operation. The HMI 7 may recognize a voice input of the driver. The HMI 7 outputs the input signal according to the operation of the driver to the ECU 10. The HMI 7 outputs information to the driver from the display or the speaker according to the control signal from the ECU 10. The HMI 7 may output the information by transferring a vibration to the driver using a vibration unit mounted on the steering wheel or on the driver's seat.

Next, a functional configuration of the ECU 10 will be described. The ECU 10 is an electronic control unit formed of a central processing unit (CPU), read only memory (ROM), random access memory (RAM), and the like. The ECU 10 controls the travelling of the host vehicle M. The ECU 10 executes various controls by loading the program stored in the ROM into the RAM and executing the program through the CPU. The ECU 10 may be configured with a plurality of electronic control units. In addition, a part of the functions of the ECU 10 described below may be executed by a computer in a facility such as an information processing center which is capable of communicating with host vehicle M.

The ECU 10 includes a switching position setting unit 11, a surrounding environment recognition unit (another vehicle recognition unit) 12, a travelling state recognition unit 13, a travel plan generation unit 14, a check timing determination unit 15, a blind area setting unit 16, an another vehicle existence determination unit 17, a possibility determination unit 18, and a control unit 19.

The switching position setting unit 11 sets the above-described switching position G. For example, in a case where the host vehicle M starts autonomous driving, the switching position setting unit 11 sets the switching position G according to the content of autonomous driving. For example, in a case where the host vehicle M starts autonomous driving exclusive for a high way, the switching position setting unit 11 sets the position of the exit of the highway in the route Mw of the host vehicle M as the switching position G based on the map information in the map database 4. In addition, the switching position setting unit 11 recognizes a road construction section, a section in which autonomous driving is restricted due to weather information, a section in which the traffic is regulated due to an accident, or the like based on road environment information acquired from the information management center via a communication unit of the navigation system 5. The switching position setting unit 11 sets the a position of an entrance of the highway as the switching position G according to the content of autonomous driving. The switching position setting unit 11 recognizes the route Mw of the host vehicle M based on, for example, a plan of a target route for autonomous driving generated by the travel plan generation unit 14 described below.

The surrounding environment recognition unit 12 recognizes the surrounding environment of the host vehicle M based on the results of detection by the external sensor 1 (for example, image information from the camera, obstacle information from the radar, obstacle information from the LIDAR, and the like). The surrounding environment includes, for example, a position of the lane lines of the travelling lane or a center position in the lane with respect to the host vehicle M, a shape of the road (for example, a curvature of the travelling lane, changes in gradient in the road effective for estimated prospects by the external sensor 1, or an undulation), and the obstacle situation around the host vehicle M (for example, information on a fixed obstacle such as a building and a moving obstacle such as another vehicle, a relative position of the obstacle with respect to the host vehicle M, a moving direction of the obstacle with respect to the host vehicle M, a relative speed of the obstacle with respect to the host vehicle M, and the like). That is, the surrounding environment recognition unit 12 recognizes the surrounding environment including the position of another vehicle around the host vehicle M.

The travelling state recognition unit 13 recognizes a travelling state of the host vehicle M based on the result of detection by the external sensor 1 and the result of detection by the internal sensor 3 (for example, vehicle speed information from the vehicle speed sensor, acceleration information from an acceleration sensor, yaw rate information from the yaw rate sensor). At least a vehicle speed of the host vehicle M and a lateral position of the host vehicle M with respect to the travelling lane R1 are included in the travelling state of the host vehicle M in the present embodiment. An acceleration (deceleration) of the host vehicle M and a yaw rate (direction) of the host vehicle M may be included in the travelling state of the host vehicle M.

The travel plan generation unit 14 generates the route Mw of the host vehicle M based on, for example, the target route calculated by the navigation system 5, the position information of the host vehicle M acquired by the GPS receiver 2, the surrounding environment of the host vehicle M recognized by the surrounding environment recognition unit 12, and the travelling state of the host vehicle M recognized by the travelling state recognition unit 13. The route Mw is a trajectory (a target trajectory in autonomous driving) on which the host vehicle M in autonomous driving proceeds along the target route. The travel plan generation unit 14 generates a route such that the host vehicle M appropriately travels in light of references such as a safety, legal compliance, and a travelling efficiency on the target route. The travel plan generation unit 14 periodically regenerates the route Mw of the host vehicle M such that the host vehicle M can avoid contact with obstacles around the host vehicle M while travelling along the target route.

In a case where the driving state of the host vehicle M is autonomous driving, the check timing determination unit 15 determines whether or not the host vehicle M reaches the check timing. The check timing determination unit 15 determines whether or not the host vehicle M reaches the check timing based on the distance between the host vehicle M and the switching position G on the route Mw of the host vehicle M. The check timing is a timing for checking a driver's state before switching the driving state of the host vehicle M from autonomous driving to manual driving. The check timing can be a timing at which the distance between the host vehicle M and the switching position G on the route Mw of the host vehicle M becomes equal to or less than a distance for checking (for example, 1 km) set in advance. Under the assumption that the host vehicle M in autonomous driving is travelling at a constant speed, the check timing may be a timing at which the remaining time until the host vehicle M will reach the switching position G becomes equal to or shorter than a time for checking (for example, 5 minutes). The distance for checking and the time for checking may be fixed values or may be values varying according to the speed (for example, a set speed in autonomous driving) of the host vehicle M.

The blind area setting unit 16 sets a driver's blind area diagonally behind the host vehicle M. The blind area setting unit 16 sets at least one of the driver's blind area among the driver's blind area AL that extends diagonally behind the left direction of the host vehicle M and the driver's blind area AR that extends diagonally behind the right direction of the host vehicle M. The blind area setting unit 16 may set the above-described expansion area. The driver's blind area AR can be an area that includes the expansion area. For example, in a case where the check timing determination unit 15 determines that the host vehicle M reaches the check timing, the blind area setting unit 16 may set the driver's blind area. The blind area setting unit 16 may always set the driver's blind area in a case where the host vehicle M is in travelling or in autonomous driving.

The blind area setting unit 16 may set the driver's blind area based on the environment of the road including the travelling lane R1 in which the host vehicle M travels. The blind area setting unit 16 sets the driver's blind area in a case where, for example, the adjacent lane (adjacent lane R2 or the adjacent lane R3) that is adjacent to the travelling lane R1 is recognized based on the position information and the map information of the host vehicle M or the image information from the vehicle-mounted camera. The adjacent lane does not include an opposite lane. Specifically, the vehicle control device 100 sets the driver's blind area AL in a case where, for example, the adjacent lane R2 on the left side of the host vehicle M is recognized. The vehicle control device 100 sets the driver's blind area AR in a case where, for example, the adjacent lane R2 on the right side of the host vehicle M is recognized.

Additionally, the check timing determination unit 15 may determine that the host vehicle M has reached the check timing when the driver performs the operation of releasing autonomous driving. The check timing determination unit 15 may determine that the host vehicle M has reached the check timing when it determines that accuracy of the sensors necessary for autonomous driving (camera, radar sensor, etc.) have deteriorated. The check timing determination unit 15 may determine that the host vehicle M has reached the check timing when it determines that the accuracy of vehicle control has deteriorated due to an actuator of the host vehicle M malfunctioning and the like. The check timing determination unit 15 may determine that the host vehicle M has reached the check timing based on positional situations between another vehicle and the host vehicle, when it determines it necessary to switch the driving state of the host vehicle M from autonomous driving to manual driving.

The blind area setting unit 16 may not set the driver's blind area in a case where an adjacent lane that is adjacent to the travelling lane R1 in which the host vehicle M travels (in a case where the road on which the host vehicle M travels is a one-direction one-lane road) is not recognized. Alternatively, even in a case where the adjacent lane that is adjacent to the travelling lane R1 in which the host vehicle M travels is not recognized, if the lane width of the travelling lane R1 is equal to or greater than a lane width threshold value set in advance, the blind area setting unit 16 may set the driver's blind area. The lane width threshold value set in advance can be a lane width set such that, for example, the host vehicle M and another vehicle (for example, a two-wheeled vehicle) can travel in parallel. In an aspect of the vehicle control device 100, at least one of the driver's blind area AL and the driver's blind area AR may be set regardless of the existence of the adjacent lane. Regardless of the existence of the adjacent lane, the vehicle control device 100 may set the driver's blind area AL in a case where the lateral position of the host vehicle M in the travelling lane R1 is positioned at the right side of the center of the travelling lane R1, and may set the driver's blind area AR in a case where the lateral position of the host vehicle M in the travelling lane R1 is positioned at the left side of the center of the travelling lane R1.

In addition, the blind area setting unit 16 may set the size of the driver's blind area AL to be variable based on the lane width of the adjacent lane R2. The vehicle control device 100, as illustrated in FIG. 3 for example, sets the range from the host vehicle M to the lane line L3 diagonally behind the left side of the host vehicle M as the driver's blind area AL based on the lane width of the adjacent lane R2. The driver's blind area AL is, for example, as illustrated in FIG. 3, set as a region expanding toward the front-rear direction of the host vehicle M to the extent of being separated from the host vehicle M. The blind area setting unit 16 may set the range from the host vehicle M to the lane line L3 diagonally behind the left side of the host vehicle M as the driver's blind area AL by recognizing the lane line L3 of the adjacent lane R2 from the image information of the vehicle-mounted camera, not the lane width of the adjacent lane R2. The driver's blind area AL does not necessarily need to reach the lane line L3, and may be set exceeding the lane line L3. The driver's blind area AL may have a fixed range regardless of the lane width of the adjacent lane and the position of the lane line. As above, the case of the driver's blind area AL is described, and the driver's blind area AR can also be similarly set.

In a case where the check timing determination unit 15 determines that the host vehicle M reaches the check timing, the another vehicle existence determination unit 17 determines whether or not another vehicle exists in the driver's blind area set by the blind area setting unit 16. The another vehicle existence determination unit 17 determines whether or not another vehicle exists in the driver's blind area based on, for example, the result of recognition by the surrounding environment recognition unit 12.

In a case where the another vehicle existence determination unit 17 determines that another vehicle exists in the driver's blind area, the possibility determination unit 18 determines whether or not the other vehicle exists, which can be removed from the driver's blind area by the control of the host vehicle M. In this case, the control of the host vehicle M is control used for removing the other vehicle from the driver's blind area among the control of the vehicle speed of the host vehicle M and the control of the lateral position of the host vehicle M. The control of the host vehicle M may be both of the control of the vehicle speed of the host vehicle M and the control of the lateral position of the host vehicle M.

The possibility determination unit 18 determines whether or not another vehicle exists, which can be removed from the driver's blind area by the control of the host vehicle M based on, for example, the result of recognition by the surrounding environment recognition unit 12 and the travelling state recognition unit 13. The possibility determination unit 18 may calculate the vehicle speed candidates for the host vehicle M illustrated in FIG. 6A and FIG. 6B using the above-described method or a known method based on the result of recognition by the surrounding environment recognition unit 12, the result of recognition by the travelling state recognition unit 13, the legal highest speed in the travelling lane R1, and the legal lowest speed in the travelling lane R1. In a case where a vehicle speed candidate for removing the other vehicle from the driver's blind area exists, the possibility determination unit 18 determines that the other vehicle exists, which can be removed by the control of the host vehicle M (control of the vehicle speed of the host vehicle M).

In addition, the possibility determination unit 18 calculates the laterally movable distance $x_R$ of the host vehicle M in the right direction and the laterally movable distance $x_L$ of the host vehicle M in the left direction, the distance $y1_R$ of the other vehicle N1 in the right direction, and the distance $y1_L$ of other vehicle N1 in the left direction illustrated in FIG. 3 based on the result of recognition by the surrounding environment recognition unit 12 and the travelling state recognition unit 13 using the above-described method or a known method. In a case where it is determined that the laterally movable distance $x_R$ is longer than the distance $y1_L$ or the laterally movable distance $x_L$ is longer than the distance $y1_R$, the possibility determination unit 18 determines that the other vehicle exists, which can be removed from the driver's blind area by the control of the host vehicle M (control of the lateral position of the host vehicle M). In addition, the possibility determination unit 18 may determine whether or not the other vehicle exists, which can be removed from the driver's blind area by the control of the host vehicle M based on the result of recognition by the surrounding environment recognition unit 12 and the travelling state recognition unit 13 using a known method.

Furthermore, the possibility determination unit 18 may determine whether or not the other vehicle exists, which cannot be removed from the driver's blind area by the control of the host vehicle M based on the result of recognition by the surrounding environment recognition unit 12 and the travelling state recognition unit 13. For example, even in a case where a plurality of other vehicles having different vehicle speeds exist in the driver's blind areas AL and AR as illustrated in FIG. 6B, and when a vehicle speed candidate of the host vehicle M (the vehicle speed candidate that can remove both the other vehicles from the driver's blind areas AL and AR) does not exist because a speed interval between the legal lowest speed and the legal highest speed in the travelling lane R1 in which the host vehicle M travels is narrow, the possibility determination unit 18 determines that the other vehicle exists, which cannot be removed from the driver's blind areas AL and AR by the control of the vehicle speed of the host vehicle M.

In addition, as illustrated in FIG. 5, even in a case where the other vehicles N1 and N2 exist in the driver's blind areas AL and AR respectively, and when the distance $y1_L$ of the other vehicle N1 is longer than the laterally movable distance $x_R$ of the laterally movable distance $x_R$ of the host vehicle M and the distance $y2_R$ of the other vehicle N2 is longer than the laterally movable distance $x_L$ of the host vehicle M, the possibility determination unit 18 determines that the other vehicles exist, which cannot be removed from the driver's blind areas AL and AR by the control of the lateral position of the host vehicle M.

In a case where both the control of the vehicle speed of the host vehicle M and the control of the lateral position of the host vehicle M are performed as the control for removing the other vehicle from the driver's blind area, and when the other vehicle which cannot be removed from the driver's blind areas AL and AR by the control of the host vehicle M in spite of the fact that both the control of the vehicle speed of the host vehicle M and the control of the lateral position of the host vehicle M are performed, the possibility determination unit 18 determines that the other vehicle exists, which cannot be removed from the driver's blind area by control of the host vehicle M. In this case, when either the other vehicle N can be removed from the driver's blind area AL by the control of the vehicle speed of the host vehicle M or the other vehicle N2 can be removed from the driver's blind area AR by the control of the lateral position of the host vehicle M, the possibility determination unit 18 determines that the other vehicle does not exist, which cannot be removed from the driver's blind area by the control of the host vehicle M. In addition, the possibility determination unit 18 may determine whether or not the other vehicle exists, which cannot be removed from the driver's blind area by the control of the host vehicle M based on the result of recognition by the surrounding environment recognition unit 12 and the travelling state recognition unit 13 using a known method.

The control unit 19 determines whether or not the host vehicle M in autonomous driving has arrived at the switching position G. The control unit 19 whether or not the host vehicle M has arrived at the switching position G based on, for example, the position information of the host vehicle M from the GPS receiver 2 and the map information in the map database 4. In a case where it is determined that the host vehicle M has arrived at the switching position G, the control unit 19 switches the driving state of the host vehicle M from autonomous driving to manual driving. The control unit 19 can switch the driving state of the host vehicle M from autonomous driving to manual driving by a known procedure.

In a case where the possibility determination unit 18 determines that the other vehicle exists, which can be removed from the driver's blind area by the control of the host vehicle M, the control unit 19 controls at least any of the vehicle speed of the host vehicle M and the lateral position of the host vehicle M such that the other vehicle is removed from the driver's blind area. The control unit 19 controls at least any of the vehicle speed of the host vehicle M and the lateral position of the host vehicle M by transmitting a control signal to the actuator 6.

In a case where the vehicle speed candidates for removing the other vehicle from the driver's blind area are calculated as illustrated in FIG. 6A and FIG. 6B, the control unit 19 sets the vehicle speed closest to the current vehicle speed of the host vehicle M among the vehicle speed candidates as the target vehicle speed v. The control unit 19 may set a vehicle speed that is higher than the current vehicle speed of the host vehicle M and closest to the current vehicle speed among the vehicle speed candidates as the target vehicle speed v. Conversely, the control unit 19 may set a vehicle speed that is lower than the current vehicle speed of the host vehicle M and closest to the current vehicle speed among the vehicle speed candidates as the target vehicle speed v.

In a case where the current vehicle speed of the host vehicle M is included in the vehicle speed candidates, the control unit 19 sets the current vehicle speed as the target vehicle speed v. When the target vehicle speed v is set, the control unit 19 controls the vehicle speed of the host vehicle M with the target vehicle speed v as the target of control such that the other vehicle is removed from the driver's blind area. The vehicle speed candidates may be calculated by the possibility determination unit 18 or by the control unit 19.

In addition, for example, in the situation illustrated in FIG. 3, in a case where it is determined that the laterally movable distance $x_R$ of the host vehicle M is longer than the distance $y1_L$ of the other vehicle N1 and it is determined that the laterally movable distance $x_L$ of the host vehicle M is longer than the distance $y1_R$ of the other vehicle N1, the control unit 19 controls the lateral position of the host vehicle M such that the other vehicle N1 is removed from the driver's blind area AL by moving the lateral position of the host vehicle M in either of the right and left direction. In this case, the control unit 19 may control the lateral position of the host vehicle M to the direction in which the host vehicle M is separated from the other vehicle N1 (here, to the right direction), or may move the lateral position of the host vehicle M to the direction in which an amount of movement of the host vehicle M becomes small among the right and left directions. The determination of whether or not the laterally movable distance $x_R$ of the host vehicle M is longer than the distance $y1_L$ of the other vehicle N1 or the like may be calculated by the possibility determination unit 18 or may be calculated by the control unit 19.

In a case where it is determined that the laterally movable distance $x_R$ is longer than the distance $y1_L$ and it is determined that the laterally movable distance $x_L$ is not longer than the distance $y1_R$, the control unit 19 moves the lateral position of the host vehicle M to the right direction as much as the distance $y1_L$. Similarly, in a case where it is determined that the laterally movable distance $x_R$ is not longer than the distance $y1_L$ and it is determined that the laterally movable distance $x_L$ is longer than the distance $y1_R$, the control unit 19 moves the lateral position of the host vehicle M to the left direction as much as the distance $y1_R$. In a case where there is enough room in the laterally movable distance $x_L$ of the host vehicle M, the control unit 19 may move the lateral position of the host vehicle M as much as a distance in which the a preset additional distance is added to the distance $y1_R$. The case of distance $y1_L$ is similar.

For example, in the situation illustrated in FIG. 5, in a case where it is determined that the laterally movable distance $x_R$ of the host vehicle M is longer than the distance $y1_L$ of the other vehicle N1 and the laterally movable distance $x_R$ of the host vehicle M is longer than the distance $y2_L$ of the other vehicle N2, the control unit 19 controls the lateral position of the host vehicle M such that both the other vehicles N1 and N2 are removed from the driver's blind areas AL and AR by moving the lateral position of the host vehicle M to the right direction. In this case, for example, the control unit 19 moves the lateral position of the host vehicle M to the right direction as much as the longer distance among the distance $y1_L$ of the other vehicle N1 and the distance $y2_L$ of the other vehicle N2.

Similarly, for example, in a case where it is determined that the laterally movable distance $x_L$ of the host vehicle M is longer than the distance $y1_R$ of the other vehicle N1 and the laterally movable distance $x_L$ of the host vehicle M is longer than the distance $y2_R$ of the other vehicle N2, the control unit 19 controls the lateral position of the host vehicle M such that both the other vehicles N1 and N2 are removed from the driver's blind areas AL and AR by moving the lateral position of the host vehicle M to the left direction.

For example, in a case where the both the other vehicles N1 and N2 can be removed from the driver's blind areas AL and AR by moving the lateral position of the host vehicle M to any direction of right and left, the control unit 19 moves the lateral position of the host vehicle M to the direction in which the amount of movement from the current lateral position of the host vehicle M is small. Alternatively, the control unit 19 may move the lateral position of the host vehicle M to the direction in which distances in the lane width direction (lateral direction) from the host vehicle M to the other vehicles N1 and N2 to the left and right becomes close to equal.

In order to remove the other vehicle from the driver's blind area, the control unit 19 may perform any one of the control of the vehicle speed of the host vehicle M and the lateral position of the host vehicle M. In order to remove the other vehicle from the driver's blind area, the control unit 19 may perform both the control of the vehicle speed of the host vehicle M and the lateral position of the control of the host vehicle M. In this case, the control unit 19 may control the vehicle speed and the lateral position of the host vehicle M at the same time or may control these individually and independently. The control unit 19, for example, may not perform the control of the lateral position of the control of the host vehicle M in an ordinary time, but in a case where another vehicle exists, which cannot be removed from the driver's blind area by the control of the vehicle speed of the host vehicle M, the control unit 19 may control the lateral position of the host vehicle M such that the other vehicle is removed from the driver's blind area. Conversely, the control unit 19, for example, may not perform the control of the vehicle speed of the host vehicle M in an ordinary time, but in a case where the other vehicle exists, which cannot be removed from the driver's blind area by the control of the lateral position of the control of the host vehicle M, the control unit 19 may control the vehicle speed of the host vehicle M such that the other vehicle is removed from the driver's blind area.

In addition, in a case where the possibility determination unit 18 determines that the other vehicle exists, which cannot be removed from the driver's blind area by the control of the host vehicle M, the control unit 19 may control the lateral position of the host vehicle M so as to be separated from the other vehicle which cannot be removed from the driver's blind area. For example, in a case where it is determined that both the other vehicles N1 and N2 to the right and left illustrated in FIG. 5 cannot be removed from the driver's blind areas AL and AR, the control unit 19 may control the lateral position of the host vehicle M such that the distances in the lane width direction (lateral direction) from the host vehicle M to the other vehicle N1 and the other vehicle N2 become equal, in such a manner that the host vehicle M is not too close to the other vehicle N1 nor to the other vehicle N2.

The control unit 19, for example, controls the lateral position of the host vehicle M so as to move from the current lateral position of the host vehicle M as much as a movement distance (for example, 0.5 m) set in advance toward the opposite side of the other vehicle which cannot be removed from the driver's blind area. The control unit 19 moves the lateral position of the host vehicle M within the range of the laterally movable distance $x_R$ and the laterally movable distance $x_L$.

In a case where the other vehicle exists, which can be removed from the driver's blind area by the control of the host vehicle M, the control unit 19 controls the lateral position of the host vehicle M such that the other vehicle is removed from the driver's blind area firstly by the control of the host vehicle M and the host vehicle M is separated from the other vehicle which cannot be removed from the driver's blind area. The control unit 19 cannot always control the lateral position of the host vehicle M so as to be separated from the other vehicle which cannot be removed from the driver's blind area. For example, firstly, in a case where the other vehicle N1 is removed from the driver's blind area AL by the control of the lateral position of the host vehicle M, and if the lateral position of the host vehicle M is controlled so as to be separated from the other vehicle N2 which cannot be removed from the driver's blind area AR, the control unit 19 does not perform the control of the lateral position of the host vehicle M so as to be separated from the other vehicle N2 when the other vehicle N1 enters the driver's blind area AL.

Furthermore, in a case where the possibility determination unit 18 determines that the other vehicle exists, which cannot be removed from the driver's blind area by the control of the host vehicle M, the control unit 19 may output a warning regarding the other vehicle which cannot be removed from the driver's blind area to the driver. The control unit 19 performs the outputting of the warning by using at least one of displaying an image on a display or outputting a voice from a speaker by, for example, transmitting the control signal to the HMI 7. The warning is a warning having a content that can notify the driver of the existence and the position of the other vehicles existing in the driver's blind area by the displayed image and the output voice. The warning may be a warning having a content that can notify the driver of the fact that the other vehicle is a vehicle which cannot be removed from the driver's blind area by the control of the host vehicle M.

The control unit 19 may output the warning immediately after the possibility determination unit 18 determines that the other vehicle exists, which cannot be removed from the driver's blind area by control of the host vehicle M, or may output the warning after a preset time (for example, one minute) has elapsed from the determination.

Control of Switching to Manual Driving by the Vehicle Control Device in the Present Embodiment Hereinafter, an example of control of switching to manual driving by the vehicle control device 100 in the present embodiment will be described. FIG. 7 is flowchart illustrating the control of switching to manual driving by the vehicle control device 100 in the present embodiment.

The control in the flowchart illustrated in FIG. 7 is repeatedly executed for each time set in advance during, for example, autonomous driving of the host vehicle M. The ECU 10 of the vehicle control device 100 sets the switching position G in advance at which the switching position setting unit 11 switches the driving state of the host vehicle M from autonomous driving to manual driving before starting the control in the flowchart illustrated FIG. 7.

As illustrated in FIG. 7, the ECU 10 of the vehicle control device 100 performs the recognition of the surrounding environment of the host vehicle M (recognizing another vehicle around the host vehicle M) by the surrounding environment recognition unit 12 as step S101. The surrounding environment recognition unit 12 recognizes the surrounding environment of the host vehicle M based on the result of detection by the external sensor 1. In step S101, in the ECU 10, the travelling state recognition unit 13 performs the recognition of the travelling state of the host vehicle M. The travelling state recognition unit 13 recognizes the travelling state of the host vehicle M based on the result of detection by the external sensor 1 and the result of detection by the internal sensor 3. Then, the processing by the ECU 10 proceeds to step S102.

In step S102, in the ECU 10, the check timing determination unit 15 determines whether or not the host vehicle M reaches the check timing set in advance. The check timing determination unit 15 determines whether or not the host vehicle M reaches the check timing based on the distance between the host vehicle M and the switching position G on the route Mw of the host vehicle M. When, for example, the distance between the host vehicle M and the switching position G becomes equal to or shorter than the distance for checking set in advance, the check timing determination unit 15 determines that the host vehicle M reaches the check timing. In a case where the check timing determination unit 15 determines that the host vehicle M does not reach the check timing, the processing by the ECU 10 returns to step S101 and repeats the processing after a preset waiting time has elapsed. In a case where the check timing determination unit 15 determines that the host vehicle M reaches the check timing, the processing by the ECU 10 proceeds to step S103.

In step S103, in the ECU 10, the blind area setting unit 16 performs setting of the driver's blind area. For example, in a case where the adjacent lane that is adjacent to the travelling lane R1 in which the host vehicle M travels is recognized, the blind area setting unit 16 performs the setting of the driver's blind area that corresponds to the adjacent lane. The blind area setting unit 16 may set the driver's blind area in variable sizes based on the lane width of the adjacent lane. The processing by the ECU 10 proceeds to step S104 after setting the driver's blind area.

The ECU 10 may omit step S103. That is, for example, the blind area setting unit 16 may have an aspect of setting the driver's blind area during traveling of the host vehicle M or during autonomous driving of the host vehicle M regardless of the determination of the check timing by the check timing determination unit 15.

In step S104, in the ECU 10, the another vehicle existence determination unit 17 determines whether or not another vehicle exists in the driver's blind area. The another vehicle existence determination unit 17 determines whether or not the other vehicle exists in the driver's blind area set by the blind area setting unit 16 based on the result of recognition by the surrounding environment recognition unit 12. In a case where it is determined that the other vehicle does not exist in the driver's blind area, the processing by the ECU 10 proceeds to step S110. In a case where it is determined that the other vehicle exists in the driver's blind area, the processing by the ECU 10 proceeds to step S105.

In step S105, in ECU 10, the possibility determination unit 18 determines whether or not the other vehicle exists, which can be removed from the driver's blind area by the control of the host vehicle M. The possibility determination unit 18 determines whether or not the other vehicle exists, which can be removed from the driver's blind area by the control of the host vehicle M based on the result of recognition by the surrounding environment recognition unit 12, the result of recognition by the travelling state recognition unit 13, the legal highest speed in the travelling lane R1, and the legal lowest speed in the travelling lane R1. In a case where it is determined that the other vehicle does not exist, which can be removed from the driver's blind area by the control of the host vehicle M, the processing by the ECU 10 proceeds to step S108. In a case where it is determined that the other vehicle exists, which can be removed from the driver's blind area by the control of the host vehicle M, the processing by the ECU 10 proceeds to step S106.

In step S106, in the ECU 10, the control unit 19 controls at least one of the vehicle speed of the host vehicle M and the lateral position of the host vehicle M such that the other vehicle is removed from the driver's blind area. The control unit 19 controls the host vehicle M by transmitting the control signal to the actuator 6. The details of the processing in step S106 will be described below. After the control of the host vehicle M such that it is removed from the driver's blind area, the processing by the ECU 10 proceeds to step S107.

In step S107, in the ECU 10, the possibility determination unit 18 determines whether or not the other vehicle exists, which cannot be removed from the driver's blind area by the control of the host vehicle M. For example, the possibility determination unit 18 determines whether or not the other vehicle exists, which cannot be removed from the driver's blind area by the control of the host vehicle M based on the result of recognition by the surrounding environment recognition unit 12, the result of recognition by the travelling state recognition unit 13, the legal highest speed in the travelling lane R1, and the legal lowest speed in the travelling lane R1. In a case where it is determined that the other vehicle does not exist, which cannot be removed from the driver's blind area by the control of the host vehicle M, the processing by the ECU 10 proceeds to step S110. In a case where it is determined that another vehicle exists, which cannot be removed from the driver's blind area by the control of the host vehicle M, the processing by the ECU 10 proceeds to step S108.

In step S108, in the ECU 10, the control unit 19 controls the lateral position of the host vehicle M such that the host vehicle M is separated from the other vehicle which cannot be removed from the driver's blind area. The control unit 19 moves the lateral position of the host vehicle M toward the opposite side of the other vehicle which cannot be removed from the driver's blind area as much as the moving distance set in advance by transmitting the control signal to the actuator 6. In a case where the lateral position of the host vehicle M is controlled, the processing by the control unit 19 proceeds to step S109.

In step S109, in the ECU 10, the control unit 19 outputs a warning regarding the other vehicle which cannot be removed from the driver's blind area. The control unit 19 performs the outputting of the warning by using at least one of displaying an image on a display or outputting a voice from a speaker by, for example, transmitting the control signal to the HMI 7. After the output of the warning, the processing by the ECU 10 proceeds to step S110.

In step S110, in the ECU 10, the control unit 19 determines whether or not the host vehicle M has arrived at the switching position G.

The control unit 19 determines whether or not the host vehicle M has arrived at the switching position G based on, for example, the position information of the host vehicle M from the GPS receiver 2 and the map information in the map database 4. In a case where it is determined that the host vehicle M has not arrived at the switching position G, the processing by the ECU 10 returns to step S104 and repeats the processing after a preset waiting time has elapsed. In a case where it is determined that the host vehicle M has arrived at the switching position G, the processing by the ECU 10 proceeds to step S111.

In step S111, the ECU 10 switches the driving state of the host vehicle M from autonomous driving to manual driving. The control unit 19 can switch the driving state of the host vehicle M from autonomous driving to manual driving in a known procedure. When the driving state of the host vehicle M has been switched to manual driving, the ECU 10 ends the control of switching in this cycle.

In the flowchart illustrated in FIG. 7 described above, step S108 and step S109 may be executed in a reverse order. In addition, only step S108 may be executed or only step S109 may be executed. Furthermore, step S108 and step S109 may not be executed either. It is not necessary to repeat step S108 and step S109 many times, and they may be executed only once.

In addition, in a case where the other vehicle exists, which cannot be removed from the driver's blind area, in step S111, before switching the driving state of the host vehicle M from autonomous driving to manual driving, a warning may be output to the driver. In addition, other than the control in the flowchart illustrated in FIG. 7, in a case where the another vehicle existence determination unit 17 determines that another vehicle continuously exists in the driver's blind area over a certain time period, the warning may be output to the driver.

In addition, in a case where a change of the vehicle speed of the other vehicle or a change of the lateral position of the other vehicle is recognized during the processing in step S104 and subsequent thereto, the processing may be executed again from S104. Similarly, in a case where it is determined that another vehicle newly enters the driver's blind area during the processing in step S104 and subsequent thereto, the processing may be executed again from S104.

Figure 8:
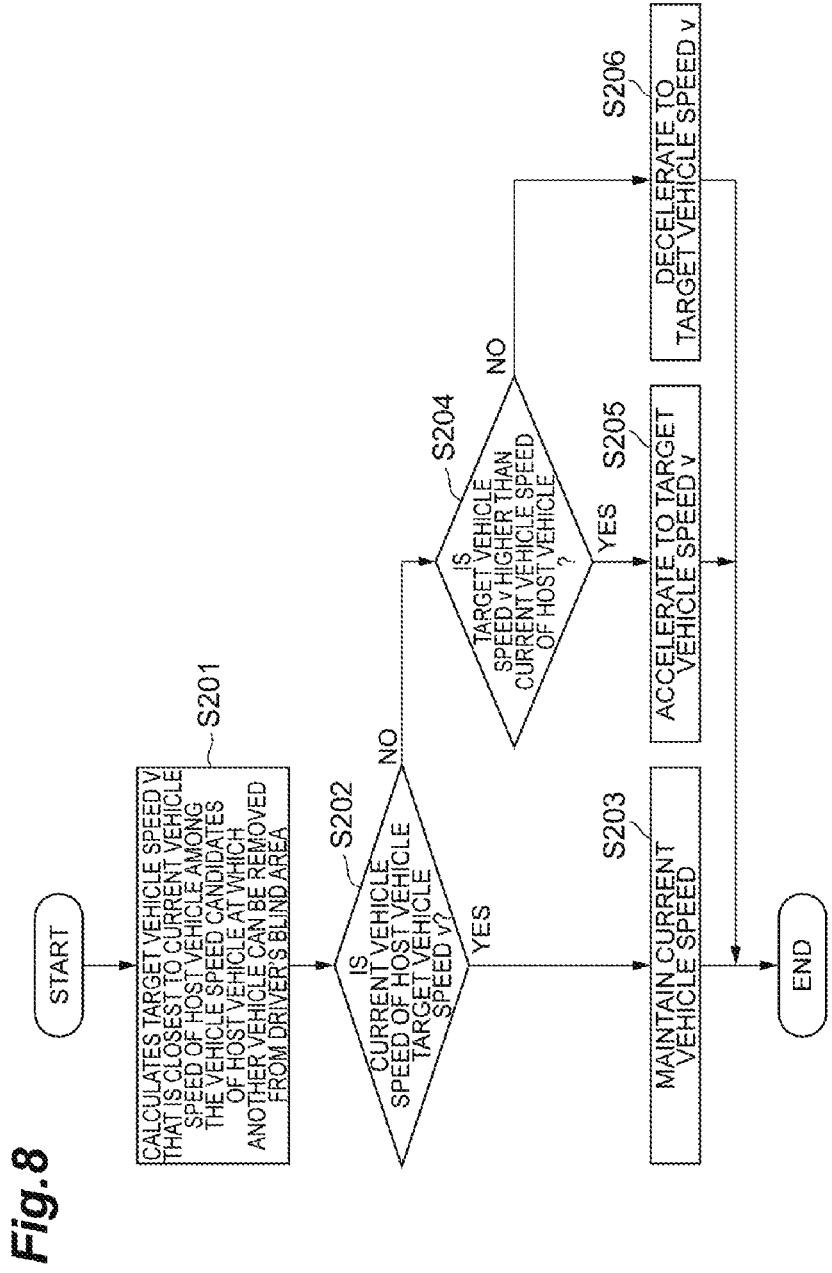
FIG. 8 is a flowchart illustrating a control of a vehicle speed of the host vehicle in order to remove another vehicle from the driver's blind area.

Control of the Vehicle Speed of the Host Vehicle by the Vehicle Control Device in the Present Embodiment Next, an example of controlling the vehicle speed of the host vehicle M by the vehicle control device 100 in the present embodiment will be described. FIG. 8 is a flowchart illustrating a control of a vehicle speed of the host vehicle M in order to remove another vehicle from the driver's blind area. The control in the flowchart illustrated in FIG. 8 is executed, for example, in step S106 illustrated in FIG. 7. Here, the vehicle speed (vehicle speed candidates) of the host vehicle M for removing the other vehicle from the driver's blind area has been already calculated.

As illustrated in FIG. 8, in the ECU 10 of the vehicle control device 100, as step S201, the control unit 19 calculates the target vehicle speed v that is closest to the current vehicle speed of the host vehicle M among the vehicle speed candidates of the host vehicle M at which the other vehicle can be removed from the driver's blind area. The control unit 19 calculates the target vehicle speed v that is closest to the current vehicle speed of the host vehicle M among the vehicle speed candidates of the host vehicle M based on, for example, the current vehicle speed of the host vehicle M that is included in the travelling state of the host vehicle M. When the target vehicle speed v is calculated, the processing by the ECU 10 proceeds to step S202.

In step S202, in the ECU 10, the control unit 19 determines whether or not the current vehicle speed of the host vehicle M is the target vehicle speed v. In a case where it is determined that the current vehicle speed of the host vehicle M is not the target vehicle speed v, the processing by the ECU 10 proceeds to step S204. In a case where it is determined that the current vehicle speed of the host vehicle M is the target vehicle speed v, the processing by the ECU 10 proceeds to step S203.

In step S203, in the ECU 10, the control unit 19 performs a control for maintaining the current vehicle speed of the host vehicle M (target vehicle speed v). For example, the ECU 10 maintains the current vehicle speed of the host vehicle M for a time set in advance. In this way, the control unit 19 controls the vehicle speed of the host vehicle M such that the other vehicle is removed from the driver's blind area. Then, the ECU 10 ends the control of the vehicle speed of the host vehicle M in this cycle.

In step S204, in the ECU 10, the control unit 19 determines whether or not the target vehicle speed v is higher than the current vehicle speed of the host vehicle M. In a case where it is determined that the target vehicle speed v is higher than the current vehicle speed of the host vehicle M, the processing by the ECU 10 proceeds to step S205. In a case where it is determined that the target vehicle speed v is not higher than the current vehicle speed of the host vehicle M, the processing by the ECU 10 proceeds to step S206.

In step S205, in the ECU 10, the control unit 19 accelerates the host vehicle M until the vehicle speed of the host vehicle M becomes the target vehicle speed v. For example, after accelerating the host vehicle M until the vehicle speed of the host vehicle M becomes the target vehicle speed v, the control unit 19 maintains the vehicle speed (target vehicle speed v) of the host vehicle M for a time set in advance. In this way, the control unit 19 controls the vehicle speed of the host vehicle M such that the other vehicle is removed from the driver's blind area. Then, the ECU 10 ends the control of the vehicle speed of the host vehicle M in this cycle.

In step S206, in the ECU 10, the control unit 19 decelerates the host vehicle M until the vehicle speed of the host vehicle M becomes the target vehicle speed v. For example, after decelerating the host vehicle M until the vehicle speed of the host vehicle M becomes the target vehicle speed v, the control unit 19 maintains the vehicle speed (target vehicle speed v) of the host vehicle M for a time set in advance. In this way, the control unit 19 controls the vehicle speed of the host vehicle M such that the other vehicle is removed from the driver's blind area. Then, the ECU 10 ends the control of the vehicle speed of the host vehicle M in this cycle.

In steps S203, S204, and S205 in the flowchart illustrated in FIG. 8 described above, instead of maintaining the vehicle speed (target vehicle speed v) of the host vehicle M for the time set in advance, the control unit 19 may maintain the vehicle speed of the host vehicle M until the another vehicle existence determination unit 17 determines that the other vehicle does not exist in the driver's blind area.

Figure 9:
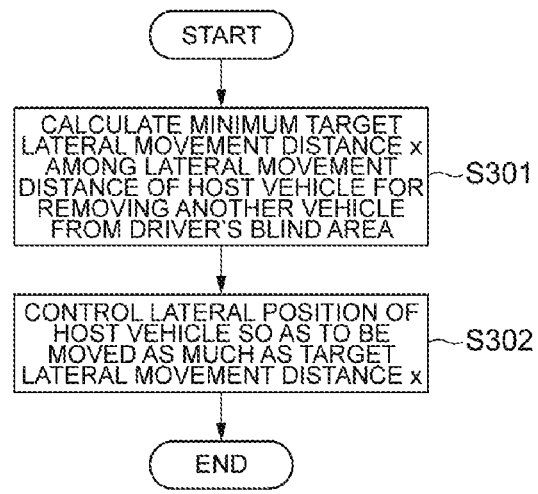
FIG. 9 is a flowchart illustrating a control of a lateral position of the host vehicle in order to remove another vehicle from the driver's blind area.

Control of the Lateral Position of the Host Vehicle by the Vehicle Control Device in the Present Embodiment Subsequently, an example of controlling the lateral position of the host vehicle M by the vehicle control device 100 in the present embodiment will be described. FIG. 9 is a flowchart illustrating a control of a lateral position of the host vehicle M in order to remove another vehicle from the driver's blind area. The control in the flowchart illustrated in FIG. 9 is executed, for example, in step S106 illustrated in FIG. 7. Here, the lateral movement distance (lateral position) of the host vehicle M for removing the other vehicle from the driver's blind area has been already calculated.

As illustrated in FIG. 9, in the ECU 10 of the vehicle control device 100, as step S301, the control unit 19 calculates a minimum target lateral movement distance x with the current lateral position of the host vehicle M among the lateral movement distance (lateral movement distance to right and left) of the host vehicle M for removing the other vehicle from the driver's blind area as the reference. At this time, the control unit 19 recognizes the movement direction (right of left direction) that corresponds to the target lateral movement distance x. When the target lateral movement distance x (target lateral position) is calculated, the processing by the ECU 10 proceeds to step S302.

In step S302, in the ECU 10, the control unit 19 moves the lateral position of the host vehicle M as much as the target lateral movement distance x. The control unit 19 moves the lateral position of the host vehicle M in the movement direction that corresponds to the target lateral movement distance x as much as the target lateral movement distance x. In this way, the control unit 19 controls the lateral position of the host vehicle M such that the other vehicle is removed from the driver's blind area. Then, the ECU 10 ends the control of the lateral position of the control of the host vehicle M in this cycle.

Only any one of the control of the vehicle speed of the host vehicle M illustrated in FIG. 8 and the control of the lateral position of the host vehicle M illustrated in FIG. 9 may be executed, or both of the above may be executed. In a case where the other vehicle still exists in the driver's blind area even when the control of the vehicle speed of the host vehicle M illustrated in FIG. 8 is executed, the control of the lateral position of the host vehicle M illustrated in FIG. 9 may be executed. Conversely, in a case where the other vehicle still exists in the driver's blind area even when the control of the lateral position of the host vehicle M illustrated in FIG. 9 is executed, the control of the vehicle speed of the host vehicle M illustrated in FIG. 8 may be executed.

Operational Effects of the Vehicle Control Device in the Present Embodiment

According to the vehicle control device 100 in the present embodiment described above, in a case where it is determined that the host vehicle M reaches the check timing and that another vehicle exists in the driver's blind area, at least any one of the vehicle speed and the lateral position of the host vehicle is controlled such that the other vehicle is removed from the driver's blind area. Therefore, according to the vehicle control device, before the host vehicle M in autonomous driving arrives at the switching position G and the driving state is switched from autonomous driving to manual driving, it is possible to control the vehicle such that the other vehicle does not exist in the driver's blind area.

In addition, in the vehicle control device 100, in a case where the other vehicle exists, which cannot be removed from the driver's blind area by the control of the host vehicle M, the control unit 19 may control the lateral position of the host vehicle M so as to be separated from the other vehicle which cannot be removed from the driver's blind area. In this case, by controlling the lateral position of the host vehicle so as to be separated from the other vehicle which cannot be removed from the driver's blind area, the vehicle control device 100 can reduce the possibility that the host vehicle is affected by the other vehicle in the driver's blind area when the driving state is switched from autonomous driving to manual driving.

Furthermore, in the vehicle control device 100, in a case where the other vehicle exists, which cannot be removed from the driver's blind area by the control of the host vehicle M, the control unit 19 may output the warning regarding the other vehicle which cannot be removed from the driver's blind area to the driver of the host vehicle. In this case, since the warning regarding the other vehicle which cannot be removed from the driver's blind area is output to the driver, the vehicle control device 100 can notify the driver of the existence of the other vehicle which cannot be visibly recognized by the driver by the warning when the driving state is switched from autonomous driving to manual driving.

As above, the embodiment of the present invention is described. However, the present invention is not limited to the embodiment described above. The present invent can be executed in various aspects in which various modifications and improvements are made based on knowledge of those skilled in the art including the embodiment described above.

What is claimed is:

1. A vehicle control device configured to be capable of switching a driving state of a host vehicle between autonomous driving and manual driving, the device comprising:
   an electronic control unit (ECU) programmed to:
   recognize a position of an other vehicle around the host vehicle;
   recognize a travelling state of the host vehicle;
   determine whether or not the host vehicle reaches a check timing set in advance, in a case where the driving state of the host vehicle is autonomous driving;
   determine whether or not the other vehicle exists in a driver's blind area set in advance diagonally behind the host vehicle based on the result of the recognition by the ECU, in a case of the determination that the host vehicle reaches the check timing;
   determine whether or not the other vehicle exists, which can be removed from the driver's blind area by control of at least one of a vehicle speed of the host vehicle and a lateral position of the host vehicle based on the result of the recognition by the ECU, in a case of the determination that the other vehicle exists in the driver's blind area; and
   execute the control of the host vehicle based on the result of the recognition by the ECU, in a case of the determination that the other vehicle exists, which can be removed from the driver's blind area by the control.

2. The vehicle control device according to claim 1, wherein, in a case where the determination is made that the other vehicle exists in the driver's blind area, the ECU is configured to determine whether or not the other vehicle exists, which cannot be removed from the driver's blind area by the control based on the result of the recognition by the ECU, and
wherein, in a case of the determination that the other vehicle exists, which cannot be removed from the driver's blind area by the control, the ECU is configured to control the lateral position of the host vehicle so as to be separated from the other vehicle which cannot be removed from the driver's blind area based on the result of the recognition by the ECU.

3. The vehicle control device according to claim 1, wherein, in a case where the determination is made that the other vehicle exists in the driver's blind area, the ECU is configured to determine whether or not the other vehicle exists, which cannot be removed from the driver's blind area by the control based on the result of the recognition by the ECU, and
wherein, in a case of the determination that the other vehicle exists, which cannot be removed from the driver's blind area by the control, the ECU is configured to output a warning regarding the other vehicle which cannot be removed from the driver's blind area to the driver of the host vehicle.

4. The vehicle control device according to claim 2, wherein, in a case of the determination that the other vehicle exists in the driver's blind area, the ECU is configured to determine whether or not the other vehicle exists, which cannot be removed from the driver's blind area by the control based on the result of the recognition by the ECU, and
wherein, in a case of the determination that the other vehicle exists, which cannot be removed from the driver's blind area by the control, the ECU is configured to output a warning regarding the other vehicle which cannot be removed from the driver's blind area to the driver of the host vehicle.

* * * * *